United States Patent [19]

Wuerker et al.

[11] 3,805,188
[45] Apr. 16, 1974

[54] SINGLE MODE LASER OSCILLATOR WITH RING RESONATOR AND INTERNAL MODE SELECTING DYE CELL

[75] Inventors: Ralph F. Wuerker, Palos Verdes Estates; Lee O. Heflinger, Torrance, both of Calif.

[73] Assignee: TRW Inc., Redondo Beach, Calif.

[22] Filed: Nov. 30, 1972

[21] Appl. No.: 310,868

[52] U.S. Cl. .............................................. 331/94.5
[51] Int. Cl. ........ H01s 3/05, H01s 3/00, H01s 3/11
[58] Field of Search ................................... 331/94.5

[56] References Cited
OTHER PUBLICATIONS

Soncini et al., IEEE Journal of Quantum Electronics, Vol. QE-4, No. 6, June, 1968, p. 422.
Yoshino et al., Osaka University Technology Reports, March, 1970, pp. 139 – 144.

Primary Examiner—Ronald L. Wibert
Assistant Examiner—R. J. Webster
Attorney, Agent, or Firm—Daniel T. Anderson; Donald R. Nyhagen; Edwin A. Oser

[57] ABSTRACT

A standing light wave within the active lasing medium of a laser oscillator is avoided, to prevent periodic bleaching of the medium and thereby foster single mode oscillation and improve coherence. The coherent light propagating from each end of the lasing medium is directed to the opposite end of the medium through a ring resonator cavity with an optically folded portion having a region through which the light waves propagating in each direction around the cavity travel first in one direction and then in the opposite direction in interfering relation to one another to produce a standing wave in the region. Located within this standing wave region is a bleachable mode selector, such as a dye cell, which is bleached by the first oscillating mode propagating in either direction through the resonator cavity to suppress counter rotating oscillating modes which would interfer with the first oscillating mode within the lasing medium to produce a standing wave in the medium.

13 Claims, 6 Drawing Figures

PATENTED APR 16 1974 3,805,188
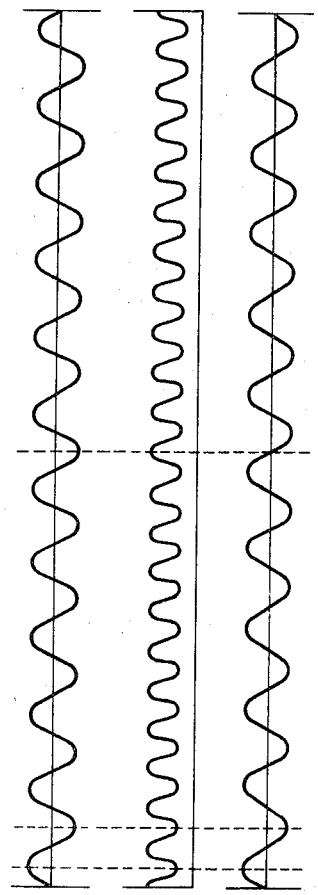
Fig. 1D STANDING WAVE OF SECOND OSCILLATING MODE
Fig. 1C INVERTED POPULATION WHEN ONLY FIRST MODE OSCILLATES
Fig. 1B STANDING WAVE OF FIRST OSCILLATING MODE
Fig. 1A SILVERED END FACE (BOTH ENDS)
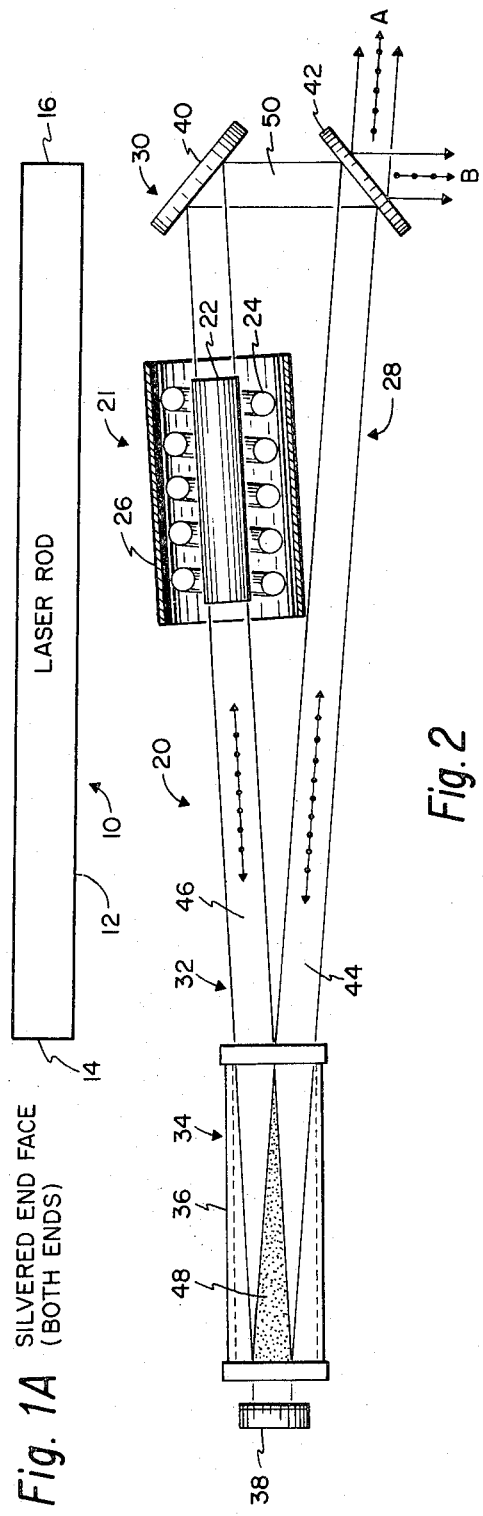
Fig. 2
Fig. 3

SINGLE MODE LASER OSCILLATOR WITH RING RESONATOR AND INTERNAL MODE SELECTING DYE CELL

RELATED APPLICATIONS

Reference is made to copending applications entitled "Single Mode Laser Oscillator with Linear Resonator and Internal Faraday Isolator", filed Nov. 30, 1972, Ser. No. 310,869; and "Single Mode Laser Oscillator with Ring Resonator and Internal Faraday Isolator", filed Nov. 30, 1972, Ser. No. 310,857.

BACKGROUND OF THE INVENTION

Field of the Invention

This invention relates generally to laser oscillators and more particularly to a method of and means for avoiding a standing light wave in the active lasing oscillator to prevent periodic bleaching of the medium and thereby foster single mode oscillation and improve coherence.

Prior Art

It is well known that in the absence of any mode selection or control means, the coherent light from the active lasing medium of a laser oscillator is composed of a plurality of discrete frequency components or longitudinal modes which are distributed over the frequency range or lasing line width of the lasing medium. Such multiple longitudinal modes reduce the temporal coherence or coherence length of the laser beam. This coherence length may be defined as the maximum path length difference which two laser beams from the same source may be mismatched and still interfere.

Coherence length is unimportant in some laser applications. In other applications, on the other hand, notably holography, high coherence, that is relatively long coherence length, is eigher highly desirable or absolutely essential. For this reason, laser oscillators which are used in these high coherence applications are equipped with means, commonly referred to as mode selectors or controllers, for suppressing all but a most favored oscillating mode. Well known examples of mode controllers are etalons and saturable absorbers, such as dye cells.

The mode controlling actions of etalons and dye cells are well understood and hence need not be explained in detail. Suffice it to say that the etalons effect mode control by a light wave interference action and saturable absorbers by a periodic bleaching action produced by the most favored longitudinal mode. The bleaching action lowers the loss for the favored mode but retains the loss for other modes relatively high.

While such mode controllers improve coherence, certain lasing mediums, particularly solid-state laser such as ruby laser, experience periodic de-inversion or de-population, referred to herein as periodic bleaching, promotes multi-mode oscillation and reduces coherence. In other words, such lasing mediums act as anti-coherence elements. This anti-coherence action is explained, for example, on pages 273-282 of Volume 10a, entitled "Laser - A Collection of Reprints with Commentary" of the International Science Review Series, published in 1968 by Gordon and Breach, Science Publishers, New York. Accordingly, it is unnecessary to explain the action in great detail. Suffice it to say that the anti-coherence action results from the fact that the light waves of an initial oscillating mode traveling in opposite directions through the lasing medium of a conventional laser oscillator have parallel planes of vibration and hence create a standing light wave in the medium. This standing light wave causes periodice bleaching, i.e., de-population, of the medium by induced emission which varies between a minimum at the nodes and a maximum at the anti-nodes of the standing wave. Accordingly, the inverted population varies between a maximum at the nodes and a minimum at the anti-nodes. This inverted population distribution is most unfavorable for the initial oscillating mode and tends to foster other modes which may commence and thus destroy mode control.

It will now be understood, therefore, that effective single mode operation of a laser oscillator requires not only mode selection or control to suppress undesired longitudinal oscillating modes but also avoidance of a standing wave in the medium which would cause periodic bleaching of the medium.

The earlier mentioned reference from the Science Review Series describes a solid-state traveling wave laser oscillator which avoids a standing wave in the laser crystal and thereby periodic bleaching of the crystal. Simply stated, this traveling wave laser has a ring resonator containing a Faraday isolator which permits propagation of light waves in only one direction through the resonator cavity. Accordingly, light wave propagation occurs essentially in only one direction through the laser crystal, thus avoiding the formation of a standing wave in the crystal and producing uniform bleaching of the crystal.

SUMMARY OF THE INVENTION

This invention provides a single mode laser oscillator having a ring resonator containing an optical ring cavity through which the coherent light propagating from each end of the active lasing medium is directed to the other end of the medium. The ring cavity includes an optically folded portion having a region through which light waves propagating in each direction around the cavity travel first in one direction and then in the opposite direction in interfering relation to one another to establish a standing wave in the region.

A bleachable mode selector, such as a dye cell, is located in this standing wave region of the resonator cavity. In the described embodiments of the invention, the lasing medium is a ruby and the mode selector is a relatively long chlorophyll dye cell.

During operation of the laser oscillator, the lasing medium is pumped in the usual way to produce coherent light which propagates in opposite directions through the resonator cavity. As in all laser oscillators, one oscillating mode grows more rapidly than others. This initial amplified mode propagates in one direction through the resonator cavity and produces within the standing wave region of the folded cavity portion a standing wave which bleaches the mode selector. The mode selector, when thus bleached by the initial mode, suppresses counter-rotating oscillating modes which would interfer with the initial oscillating mode within the lasing medium to produce a standing wave in the medium. Accordingly, a standing wave in and periodic bleaching of the lasing medium are avoided to faster single mode oscillation and thereby improve coherence.

Two different embodiments of the laser oscillator are described. One embodiment has a generally triangular resonator cavity with a reflector at each corner. Two legs of this cavity are disposed at a relatively sharp acute angle relative to one another and form with the adjacent reflector the optically folded portion of the cavity. The adjacent cavity reflector is located at the intersection of the optical paths through the two cavity legs and oriented at an angle such that light waves arriving at the reflector along either path are reflected along the other path. The angle between the two optical paths is sufficiently small that the oppositely traveling light waves along the two paths, i.e., the waves traveling to the reflector along one path and the waves reflected from the reflector along the other path, intersect one another. Within their intersection zone, the light waves interfer with one another and produce the standing wave which bleaches the mode selector to suppress counter-rotating oscillating modes.

The second described embodiment of the invention has a resonator cavity with the general shape of a figure 8. In this form, the oppositely traveling light waves which interfer to produce a standing wave propagate along intersecting optical paths which cross one another at a small acute angle within the standing wave region containing the bleachable mode selector.

BRIEF DESCRIPTION OF THE DRAWINGS

FIGS. 1A through 1D depict the anti-coherence action of the lasing medium in a conventional laser oscillator;

FIG. 2 illustrates a single mode laser oscillator according to this invention; and FIG. 3 illustrates a modified single mode laser oscillator according to the invention.

DESCRIPTION OF THE PREFERRED EMBODIMENTS

FIG. 1A illustrates a conventional laser oscillator 10 having an active lasing medium 12, in this case a solid-state medium such as a ruby rod with end reflectors 14, 16. The pumping means for the lasing medium has been omitted for clarity. During operation of the laser oscillator, the plane polarized coherent light propagating from the ends of the medium is reflected back and forth through the medium, resulting in oppositely traveling light waves in the medium. These light waves are plane polarized in the same direction or plane, and assuming the existence of a single initial oscillating mode, give rise to a standing light wave (FIG. 1B) in the medium. The induced emission produced by this standing wave varies between a minimum, i.e., zero, at the nodes and a maximum at the anti-nodes of the standing wave, thus causing corresponding periodic bleaching of the lasing medium and creating the inverted population distribution of FIG. 1C.

It will be observed that the resulting inverted population density varies between a maximum at the nodes and a minimum at the anti-nodes of the standing wave. This inverted population distribution is obviously unfavorable to the initial oscillating mode which created the distribution and favors other longitudinal modes, particularly that of FIG. 1D whose electric field has a maximum coinciding with a maximum than the inverted population density at the center of the lasing medium. This second mode will thus have more gain that the initial mode and hence will go into oscillation. The two oscillating modes will then produce a new standing wave in the lasing medium which will cause corresponding periodic bleaching of the medium favoring initiation of a third oscillating mode. Additional oscillating modes may be initiated by repetition of this action, resulting in multi-mode oscillation of the laser oscillator.

The lasing medium in a conventional laser oscillator thus fosters multiple oscillating modes. As is well-known to those versed in the art, such multiple modes reduced the coherence length of the oscillator which is undesirable or totally unacceptable for certain laser applications, such as holography. In other words, the lasing medium acts as an anti-coherence element.

The single mode laser oscillator of this invention suppresses or eliminates this anti-coherence action. Turning to FIG. 2, the illustrated laser oscillator 20 has a laser 21 including a lasing medium 22, in this case a solid-state lasing medium such as a ruby. Surrounding this lasing medium is an optical pumping means 24, such as a helical Xenon flash lamp, surrounded by a cylindrical reflector 26. Lasing medium 22 is contained within the cavity 28 of an optical ring resonator 30. Coherent light propagating from each end of the lasing medium when the latter is pumped is directed through the resonator cavity to the opposite end of the medium.

Resonator cavity 28 includes an optically folded portion 32 having a region 34 through which light waves propagating in each direction through the cavity travel first in one direction and then in the opposite direction in interfering relation to one another to establish a standing wave in the region. Located within the standing wave region 30 is a bleachable mode selector 36, such as a dye cell.

In operation of the laser oscillator, the lasing medium 22 is caused to lase by pumping it with the flash lamp 24. The coherent light propagating from each end of the lasing medium is directed through the resonator ring cavity 28 to the opposite end of the medium. As in all lasers, one oscillating mode grows more rapidly than others.

The resonator 30 of the laser oscillator illustrated in FIG. 2 has a generally triangular ring cavity 28 with reflectors 38, 40 and 42 at its corners. Two legs or optical paths 44, 46 of this cavity are disposed at a relatively sharp acute angle relative to one another and together with the adjacent reflector 38 constitute the optically folded portion 32 of the resonator cavity. The reflector 38 is located at the intersection of the optical paths 44, 46 and is so oriented that coherent light propagating in either direction around the resonator cavity 28 arrives at the reflector along one of the optical paths 44, 46 and is reflected back along the other path.

The standing wave region 34 of the laser oscillator is located directly in front of the cavity reflector 38. The angle between the optical paths 44, 46 is made sufficiently small that the oppositely traveling light waves within the region 34, that is the waves traveling toward the reflector 38 along one path and away from the reflector along the other path, resulting from coherent light propagation in each direction through the resonator cavity 28 intersect one another within a zone 48 to produce a standing wave in this zone. In the particular laser oscillator under discussion, this intersection or standing wave zone is generally triangular in shape. The bleachable mode selector 36 is located in the standing wave region 34 so as to be bleached by the standing wave produced in the zone 48 by the first oscillating mode. As noted earlier, this bleaching of the mode selector by the first oscillating mode suppresses other modes to prevent a standing wave in and periodic bleaching of the lasing medium 22 and thereby improve coherence.

The resonator reflectors 40 and 42 are oriented to reflect coherent light propagating in either direction around the triangular resonator cavity 28 from one optical path 44, 46 to the other along the third optical path 50 of the cavity. Reflector 42 is the output reflector. The output beam of the laser oscillator will emerge through the output reflector 42 in along either of two directions, A or B, depending upon the direction of propagation around the cavity 28 of the first oscillating mode which bleaches the mode selector 36.

The modified single mode laser oscillator 100 of FIG. 3 has a ring resonator 102 with an optical cavity 104 of generally figure 8 configuration containing the lasing medium 106 of a laser 108. Cavity 104 has four legs or optical paths 110, 112, 114, and 116 and four reflectors 118, 120, 122, and 124. The three optical paths 110, 112, 114 and two reflectors 118, 120 constitute an optically folded portion of the cavity having a region 126 through which coherent light waves propagating in either direction around the cavity travels first in one direction and then in the opposite direction in interferring relation to one another to establish a standing wave in the region.

In this particular embodiment, the two optical paths 110, 112 along which the light waves travel in opposite directions through the standing wave region 126 cross one another within the region at a relatively sharp acute angle. The angle between these optical paths is made sufficiently small that the waves traveling in opposite directions along the paths intersect one another within a generally diamond shaped zone 128 to establish a standing light wave in the zone. A bleachable mode selector or dye cell 130 is located in the region 126 to be bleached by this standing wave. As in the earlier described embodiment of the invention, the mode selector is bleached by the standing wave produced by the first oscillating mode propagating in either direction around the resonator cavity 104 and thereby suppresses counter-rotating modes to avoid periodice bleaching of and hence a standing wave in the lasing medium 106 and thereby faster single mode oscillation and improve coherence.

Cavity reflector 124 is the output reflector. The output beam may propagate through this output reflector in either of the directions A or B, depending upon the direction of propagation through the resonator cavity 104 of the first oscillating mode to bleach the mode selector 130.

In the claims:

1. A high coherence pulsed laser oscillator having a non-standing wave gain region, comprising:
an active lasing medium for producing plane plarized coherent light;
means for pumping said medium to produce in said medium a population inversion creating light emission from the medium;
optical resonator means including reflectors forming a ring cavity having a first optical path containing said medium along which light waves propagating in either direction around said cavity travel in one direction only to stimulate emission of a coherent light beam from the inverted medium without creation of a standing wave in the medium, and a second optically folded path having a region through which light waves propagating in either direction around said cavity travel first in one direction and then in the opposite direction in interferring relation to one another, whereby the oppositely traveling waves in said region establish a standing wave in said region; and
a bleachable mode selector in said region adapted to be periodically bleached by said latter standing wave.

2. A laser oscillator according to claim 1 wherein:
said mode selector comprises a dye cell.

3. A laser oscillator according to claim 1 wherein:
said lasing medium is a ruby.

4. A laser oscillator according to claim 3 wherein:
said mode selector comprises a chlorophyll dye cell.

5. A laser oscillator according to claim 1 wherein:
said folded optical path comprises two intersecting optical paths disposed at a relatively sharp acute angle relative to one another, such that the oppositely traveling waves traversing the latter paths intersect one another to produce said standing wave in said region.

6. A laser oscillator according to claim 5 wherein:
said resonator reflectors include a reflector at the intersection of said intersecting optical paths for reflecting along either latter path the light waves arriving at the reflector along the other latter path.

7. A laser oscillator according to claim 6 wherein:
said resonator cavity is triangular and includes a third optical path intersecting said two first mentioned intersecting optical paths;
said resonator reflectors include additional reflectors at the intersections of said third path with said two first mentioned intersecting paths for reflecting light waves from either latter path to the other along said third path;
one of said additional reflectors comprises an output reflector;
said mode selector comprises a dye cell, such as a chlorophyll dye cell; and
said lasing medium comprises a solid-state lasing medium, such as a ruby.

8. A laser oscillator according to claim 1 wherein:
said folded optical path comprises two optical paths which cross one another within said region at a relatively small acute angle relative to one another, such that the oppositely traveling waves traversing the latter paths intersect one another to produce said standing wave in said region.

9. A laser oscillator according to claim 8 wherein:
said resonator cavity has a third optical path beyond one end of said mode selector and intersecting said crossing optical paths; and
said resonator reflectors include reflectors at the intersections of said third path and crossing paths for reflecting light waves from either latter path to the other along said third path.

10. A lasser oscillator according to claim 9 wherein:
said resonator cavity has a generally figure 8 configuration and includes a fourth optical path beyond the opposite end of said mode selector intersecting said crossing optical paths;

said resonator reflectors include additional reflectors at the intersections of said fourth path and said crossing paths for reflecting light waves from either latter path to the other along said fourth path;

one of said additional reflectors comprises an output reflector;

said mode selector comprises a dye cell, such as a chlorophyll dye cell; and said lasing medium comprises a solid-state lasing medium, such as a ruby.

11. The method of avoiding a standing light wave in the active lasing medium of a laser oscillator to avoid periodic bleaching of the medium and thereby improve coherence, comprising the steps of:

pumping said medium to produce in said medium a population inversion creating light emission from the medium;

directing the light waves through a resonant optical ring cavity having a first optical path containing said medium along which light waves propagating in either direction around said cavity travel in one direction only to stimulate emission of a coherent light-beam from the inverted medium without creation of a standing wave in the medium, and a second optically folded path having a region through which light waves propagating in either direction around said cavity travel first in one direction and then in the opposite direction in interferring relation to one another, whereby the oppositely traveling waves in said region establish a standing wave in said region; and exposing a bleachable mode selecting medium to the standing wave in said region.

12. The method according to claim 11 wherein:

said directing step includes directing said light waves through said region along two intersecting optical paths disposed at a relatively sharp acute angle relative to one another, such that the oppositely traveling waves traversing said latter paths intersect one another to produce said standing wave in said region.

13. The method according to claim 11 wherein:

said directing step includes directing said light waves through said region along two optical paths which cross one another within said region at a relatively small acute angle relative to one another, such that the oppositely traveling waves traversing said latter paths intersect one another to produce said standing wave in said region.

* * * * *

UNITED STATES PATENT OFFICE
CERTIFICATE OF CORRECTION

Patent No. 3,805,188            Dated April 16, 1974

Inventor(s) Ralph F. Wuerker and Lee O. Heflinger

It is certified that error appears in the above-identified patent and that said Letters Patent are hereby corrected as shown below:

Page 1, before the ABSTRACT, insert the following paragraph:
-- The invention herein was made in the course of or under a contract, subcontract thereunder, (or grant), with the Department of the Air Force.--

Column 1, line 38             correct "eigher" to -- either --.

Column 3, line 64             correct "than" to -- of --.

Column 5, lines 58 and 59     delete "for producing plane plarized coherent light".

Signed and sealed this 17th day of September 1974.

(SEAL)
Attest:

McCOY M. GIBSON JR.
Attesting Officer

C. MARSHALL DANN
Commissioner of Patents